Figure 1:
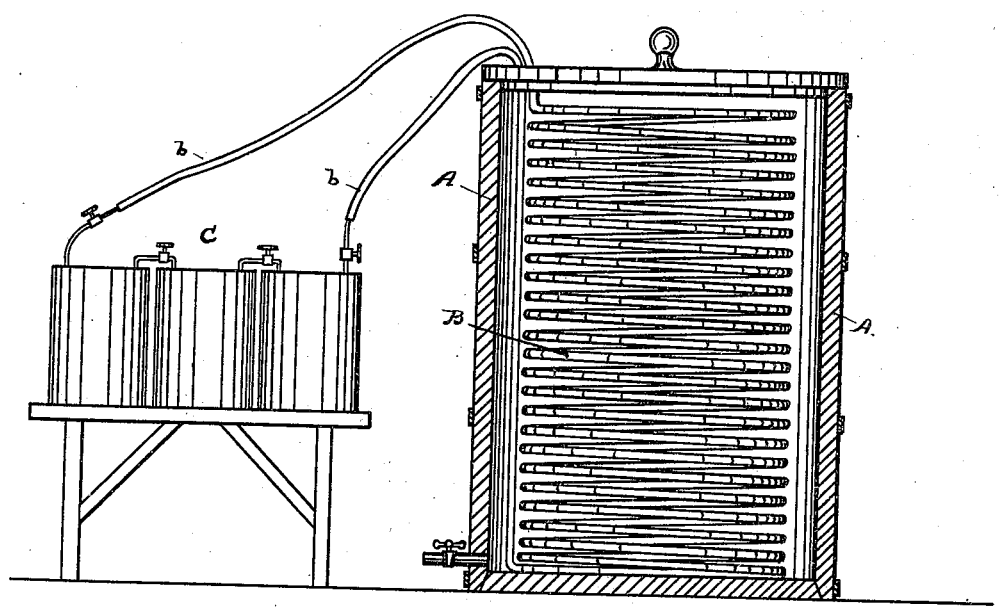

(No Model.)

E. J. FRASER.

APPARATUS FOR TREATING WINES AND LIQUORS BY ELECTRICITY.

No. 339,540. Patented Apr. 6, 1886.

Witnesses:

Inventor:

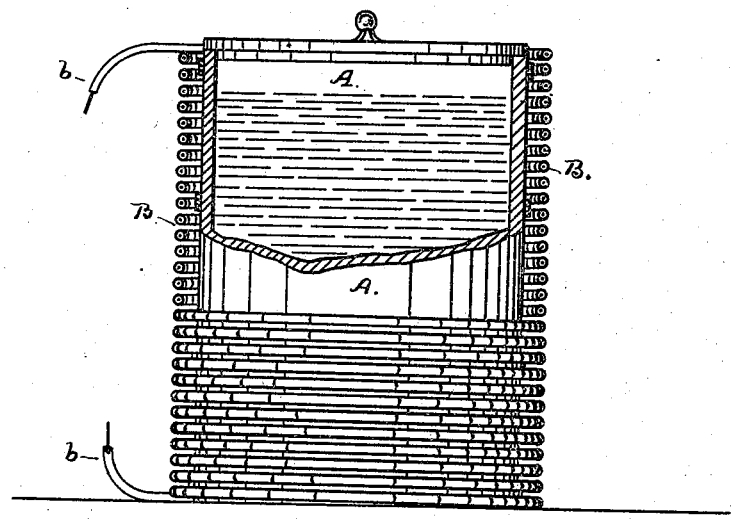

UNITED STATES PATENT OFFICE.

EDWIN J. FRASER, OF SAN FRANCISCO, CALIFORNIA.

APPARATUS FOR TREATING WINES AND LIQUORS BY ELECTRICITY.

SPECIFICATION forming part of Letters Patent No. 339,540, dated April 6, 1886.

Application filed September 8, 1885. Serial No. 176,479. (No model.) Patented in England September 19, 1885, No. 1,153.

*To all whom it may concern:*

Be it known that I, EDWIN J. FRASER, a citizen of the United States, residing in the city and county of San Francisco, in the State of California, have invented certain new and useful Improvements in Apparatus for Treating Wines and Liquors with Electricity; and I do hereby declare that the following is a full, clear, and exact description of my said invention, reference being had to the drawings that accompany and form part of this specification.

My invention relates to an improved apparatus for use in treating wines and liquors with electricity according to the method or process discovered and invented by me for treating or working upon liquors in which an electric or magnetic condition is induced and maintained by placing the liquor within the field or influence of an electro-magnetic coil or helix having connection with a suitable battery. As such method or process, as well as the apparatus for carrying out and working it, is new, I have made the method or process itself the subject of a separate application for Letters Patent, while the invention herein described is confined to and consists of an apparatus suitable for working wines and liquors according to the aforesaid method.

This invention consists in the combination of a suitable vessel to hold the liquid for treatment and an electric coil or helix formed of insulated or covered wire, substantially as hereinafter set forth, and in the production of an apparatus by means of which an electric or magnetic condition or action may be set up and maintained in a body of liquor without having the liquor in contact with the surfaces of metallic or other conductors that are employed to produce the electric current, as is necessarily done in other processes of the kind where electricity is employed.

I proceed to carry out my invention and produce an apparatus for the purposes described substantially as follows, the said drawings being referred to by figures and letters.

Figure 1 represents a form of the apparatus in which one coil or helix and a cell-battery of three cells are used, and Fig. 2 represents that construction in which the coil is placed around the outside of the vessel. These views are elevations partly in section.

In either form there shown A is a vessel capable of holding liquid, and B is a coil of insulated or covered wire constituting what is commonly known as an "electro-magnetic helix," of which the terminals *b b* are connected to a battery or other suitable generator, C. The vessel should be fitted with a cover to protect the liquor from dust and other matter, and to prevent loss by evaporation, while for convenience of removing the contents there should be an outlet at the bottom.

Wood is recommended as the most suitable material of which to make the vessel, and the cylindrical form as the best for general use, particularly where the coil is placed around the outside; but in constructing an apparatus of considerable capacity for treating a large quantity of liquor, and where several coils are placed in it, the vessel may be a tank of rectangular form, of which the width and length will be governed by the diameters and numbers of the helices employed.

In that form of the apparatus shown in Fig. 2 the walls of the vessel may be quite thin and light, as the coils or layers of wire laid around it to form the helix will support and strengthen the vessel. As the purpose of this vessel is simply to hold and retain the liquid within the helix, it will be obvious that the same may be attained in other ways—such, for instance, as forming a close cylinder out of the coil itself and closing the bottom. This may be done by covering or coating the interior surface of the coil with some suitable substance or material that will close up the spaces and interstices, and will be also impervious to the liquid and not affected by alcohol.

The helix B is formed in the usual way out of insulated or covered wire, and in its construction I would recommend that the principles and rules laid down for the production of electro-magnetic helices be observed and followed as closely as practicable in proportioning the length and diameter of this helix. It is not required, however, for the proper and successful working of my apparatus that any exact proportions should be followed. I have obtained good results from a helix eight (8) inches in diameter by forty-eight (48) inches long, formed out of covered wire, about No. 17 standard gage, with a vessel of ten (10) gallons capacity and of suitable depth to inclose the helix. A "gravity" battery of one cell six by eight (6x8) inches would be sufficiently powerful for treating such quantity of liquor.

In the apparatus as constructed according to Fig. 1 of the drawings, where the coil will be immersed, it will be necessary to coat or cover the wire with some insulating material that will be impervious to the liquor and will not be affected by alcohol, but in the other construction, having the coil outside of the vessel, this covering may be omitted, and the insulation need be only that required for the proper construction of the helix.

From the foregoing description and illustrations any person familiar with the construction and handling of electrical apparatus can readily produce and work an apparatus of this character, and treat wines and liquors therewith in accordance with my improved process before mentioned.

Having thus fully described my invention, what I claim, and desire to secure by Letters Patent, is—

1. The combination of a suitable vessel or receptacle to hold a body of liquid and an electro-magnetic helix, B, connected with a battery or generator for supplying electricity, substantially as described, for operation as set forth.

2. An apparatus for treating or working upon wines and liquors by induction, consisting of a suitable vessel or receptacle for the liquid and an electro-magnetic helix, within the field of which the liquid is held by the receptacle, substantially as herein described.

EDWIN J. FRASER.

Witnesses:
EDWARD E. OSBORN,
T. W. MEAD.

It is hereby certified that in Letters Patent No. 339,540, granted April 6, 1886, upon the application of Edwin J. Fraser, of San Francisco, California, for an improvement in "Apparatus for Treating Wines and Liquors by Electricity," errors appear requiring correction, as follows: The words "subject to the limitation prescribed by Sec. 4887, Rev. Stats., by reason of English patent dated September 19, 1885, No. 1,153," at the end of the grant and the words "Patented in England September 19, 1885, No. 1,153," at the head of the specification should be stricken out, it appearing that the English patent was not completed until June 18, 1886, which was subsequent to the issue of the United States patent, and consequently the said United States patent should not be limited thereby; and that the Letters Patent should be read with these corrections therein that the same may conform to the record of the case in the Patent Office.

Signed, countersigned and sealed this 11th day of March, A. D. 1890.

[SEAL.]

Countersigned:

R. J. FISHER,
    *Acting Commissioner of Patents.*

CYRUS BUSSEY,
*Assistant Secretary of the Interior.*